(12) United States Patent
Jin et al.

(10) Patent No.: US 12,508,719 B2
(45) Date of Patent: Dec. 30, 2025

(54) FILTER REPLACEMENT DEVICE

(71) Applicant: M&D CO., LTD., Suwon-si (KR)

(72) Inventors: Young Hoon Jin, Ansan-si (KR); Jong Jin Kim, Suwon-si (KR); Seong Sin Kim, Suwon-si (KR); Jang Bom Chai, Seoul (KR); Jong Hwa Lee, Suwon-si (KR)

(73) Assignee: CORE ROBOTICS Co., Ltd., Seoul (KR)

( * ) Notice: Subject to any disclaimer, the term of this patent is extended or adjusted under 35 U.S.C. 154(b) by 411 days.

(21) Appl. No.: 18/041,281

(22) PCT Filed: Oct. 14, 2020

(86) PCT No.: PCT/KR2020/014006
§ 371 (c)(1),
(2) Date: Feb. 10, 2023

(87) PCT Pub. No.: WO2022/034965
PCT Pub. Date: Feb. 17, 2022

(65) Prior Publication Data
US 2024/0029905 A1    Jan. 25, 2024

(30) Foreign Application Priority Data
Aug. 11, 2020   (KR) .......... 10-2020-0100440

(51) Int. Cl.
| B25J 15/00 | (2006.01) |
| B25J 9/04 | (2006.01) |
| B25J 13/08 | (2006.01) |
| B25J 19/02 | (2006.01) |

(52) U.S. Cl.
CPC ........... *B25J 15/0019* (2013.01); *B25J 9/046* (2013.01); *B25J 13/085* (2013.01); *B25J 19/023* (2013.01)

(58) Field of Classification Search
CPC ..................................................... B25J 15/0019
See application file for complete search history.

(56) References Cited

FOREIGN PATENT DOCUMENTS

| CN | 205600732 U | 9/2016 | |
| DE | 202015101098 U1 * | 7/2016 | ............. B23P 19/06 |
| JP | 05256985 A | 10/1993 | |
| JP | 2010152664 A * | 7/2010 | |
| JP | 2017-056546 A | 3/2017 | |
| KR | 20-0262999 | 1/2002 | |
| KR | 10-2015-0012510 A | 2/2015 | |
| KR | 10-2015-00012510 A | 2/2015 | |

(Continued)

OTHER PUBLICATIONS

Machine translation of DE-202015101098-U1 (Year: 2020).*
(Continued)

*Primary Examiner* — Randell J Krug
(74) *Attorney, Agent, or Firm* — Sandberg Poenix & von Gontard, PC

(57) ABSTRACT

Disclosed is a filter replacement device which can replace a filter in a radioactivated structure. The filter replacement device comprises: a body; an articulated manipulator provided at one side of the body and having five degrees of freedom; a tool detachably provided at the end of the manipulator so as to perform all operations for replacing a filter in a target object; and a socket detachably provided on the tool.

11 Claims, 9 Drawing Sheets

(56) References Cited

FOREIGN PATENT DOCUMENTS

KR       10-0724490 B1     4/2017
KR       101955165 B1 *    2/2019

OTHER PUBLICATIONS

Machine translation of JP-2010152664-A (Year: 2010).*
Machine translation of KR-101955165-B1 (Year: 2019).*
European Search Report corresponding to EP 20949597.7 dated Feb. 6, 2024.
International Search Report corresponding to PCT/KR2020/014006 mailed May 6, 2021.
Written Opinion corresponding to PCT/KR2020/014006 mailed May 6, 2021.

* cited by examiner

FILTER REPLACEMENT DEVICE

CROSS-REFERENCE TO RELATED APPLICATIONS

This application is the US National Stage under 35 USC § 371 of International Application No. PCT/KR2020/014006, filed 14 Oct. 2020 which claims priority to Korean Application No. 10-2020-0100440 filed 11 Aug. 2020, both of which are incorporated herein by reference.

TECHNICAL FIELD

The following description relates to a filter replacement device for replacing a filter in a facility such as a nuclear reactor.

BACKGROUND

A nuclear reactor is a device designed to use the heat generated during nuclear fission to generate electricity or to obtain basic particles of matter such as neutrons and radiation for use in scientific research or technological development, which continuously maintains and controls nuclear fission. Nuclear reactors are mostly used to generate electrical energy, and are also used to power ships.

Such nuclear reactors are provided with various nuclear power plant radioactive structures. Here, a nuclear power plant radioactive structure refers to a structure that is radiated by absorbing neutrons, that is, has radioactivity, among waste structures generated when a nuclear reactor is dismantled after operation has been completed.

Meanwhile, the radioactive structure is provided with various filters. For example, a reactor coolant filter, a seal injection filter, a seal water bypass filter, a boric acid filter, a spent fuel storage tank purifying filter, a boric acid purifying filter, and the like may be provided. However, in order to replace the filter, there is a risk of overexposure as a worker is exposed to radioactivity generated from the radioactive structure and the waste filter. In addition, since the size of the filter is large, there is a risk of safety accidents such as a worker falling during filter replacement.

The above description is information the inventor(s) acquired during the course of conceiving the present disclosure, or already possessed at the time, and is not necessarily art publicly known before the present application was filed.

DISCLOSURE OF THE INVENTION SUMMARY

Technical Goals

Example embodiments provide a filter replacement device which can replace a filter in a radioactive structure.

The technical goals obtainable from the example embodiments are not limited to the above-mentioned technical goals. And, other unmentioned technical goals may be clearly understood from the following description by those having ordinary skill in the technical field to which the present disclosure pertains.

Technical Solutions

A filter replacement device according to example embodiments will be described.

The filter replacement device for replacing a filter in a target object including a radioactive structure includes a body, an articulated manipulator provided at one side of the body and having five degrees of freedom, a tool detachably provided at an end of the manipulator to perform all operations for replacing a filter in a target object, and a socket detachably provided on the tool.

According to an aspect, the manipulator includes a plurality of arm members, a plurality of movable parts provided to connect and rotate the plurality of arm members, and a tool mounting part provided at an end of a first arm member among the plurality of arm members and to which the tool is coupled, and the tool mounting part becomes a first movable part so that the tool is rotatable with respect to the first arm member.

According to an aspect, the manipulator may further include an FT sensor provided on the first arm member to detect force and torque applied to the tool mounting part. In addition, the manipulator may further include a servo motor provided on the first arm member to precisely drive the tool. In addition, the manipulator may further include a reducer provided between the first arm member and the tool mounting part to increase torque of the servo motor.

According to an aspect, the manipulator may further include an imaging unit provided on the first arm member to capture an image for detecting a position of a bolt in the target object. A control unit controlling an operation of the manipulator from a remote location may be further included, wherein the control unit may obtain 3D coordinates of the target object from the image captured by the imaging unit and perform calibration to correct the obtained 3D coordinates.

According to an aspect, the socket may include a socket body in which a tool connecting groove into which the tool is inserted and coupled is formed at one end and a bolt connecting groove into which a bolt is inserted and coupled is formed at the other end, and a hook part having a hook shape, integrally formed on the other end of the socket body and coupled to a lid or a filter provided in the target object. For example, the hook part may be formed by a portion of the socket body being cut. Alternatively, the hook part may be formed by a portion of an outer circumferential surface of a portion of the socket body where the bolt connecting groove is formed being cut.

According to an aspect, a plurality of moving parts for moving the body, and a fastening part for fixing a position when the body is installed may be further provided. Here, the fastening part may be provided to be withdrawn from and introduced into the body, so that when the body is moved, the fastening part may be introduced into the body, and when the body is installed in an operation position, the fastening part may be withdrawn to fix the position of the body to the ground.

Effects

According to an example embodiment, a filter replacement device may be inserted in a radioactive structure to replace a filter, and since a worker implements the filter replacement device at a remote location of the radioactive structure, exposure of the worker to radiation may be minimized.

The effects of the filter replacement device according to example embodiments are not limited to the above-mentioned effects, and other unmentioned effects may be clearly understood from the following description by one of ordinary skill in the art.

DESCRIPTION OF THE BEST MODE FOR CARRYING OUT THE INVENTION

Figure 1:
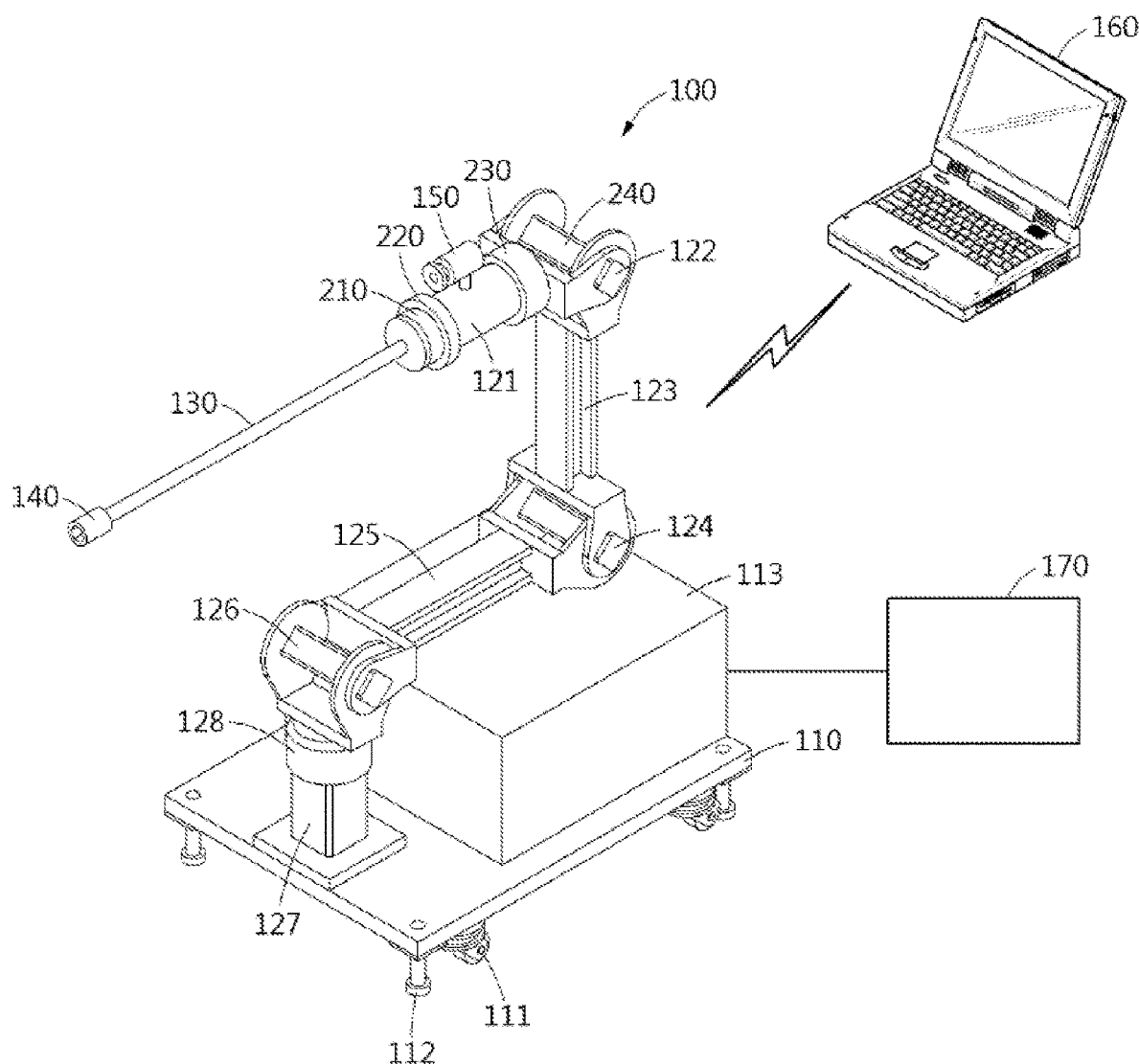
FIG. 1 is a perspective view of a filter replacement device according to an example embodiment.
Figure 2:
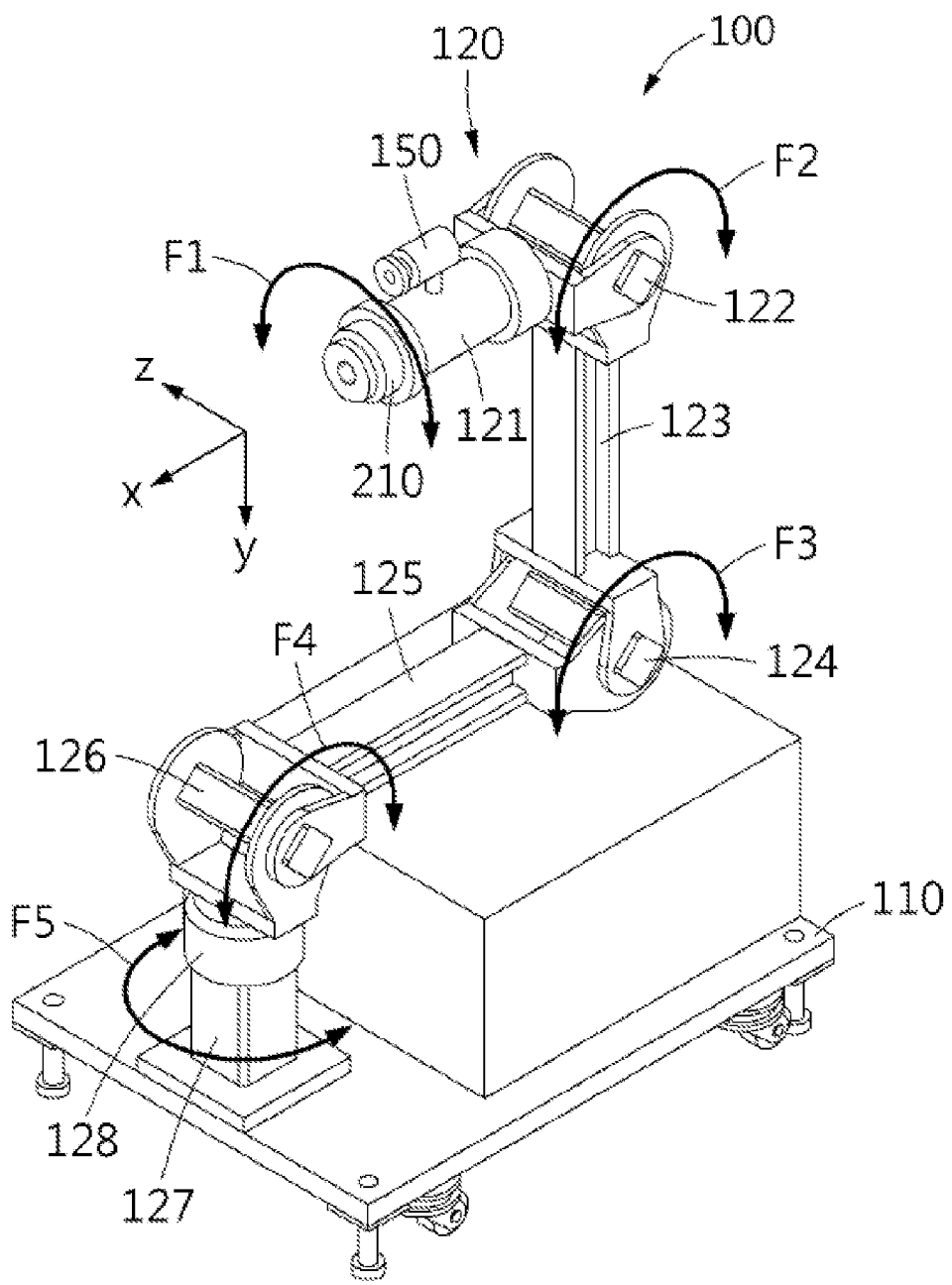
FIG. 2 is a perspective view illustrating five degrees of freedom of an articulated manipulator in the filter replacement device of FIG. 1.
Figure 3:
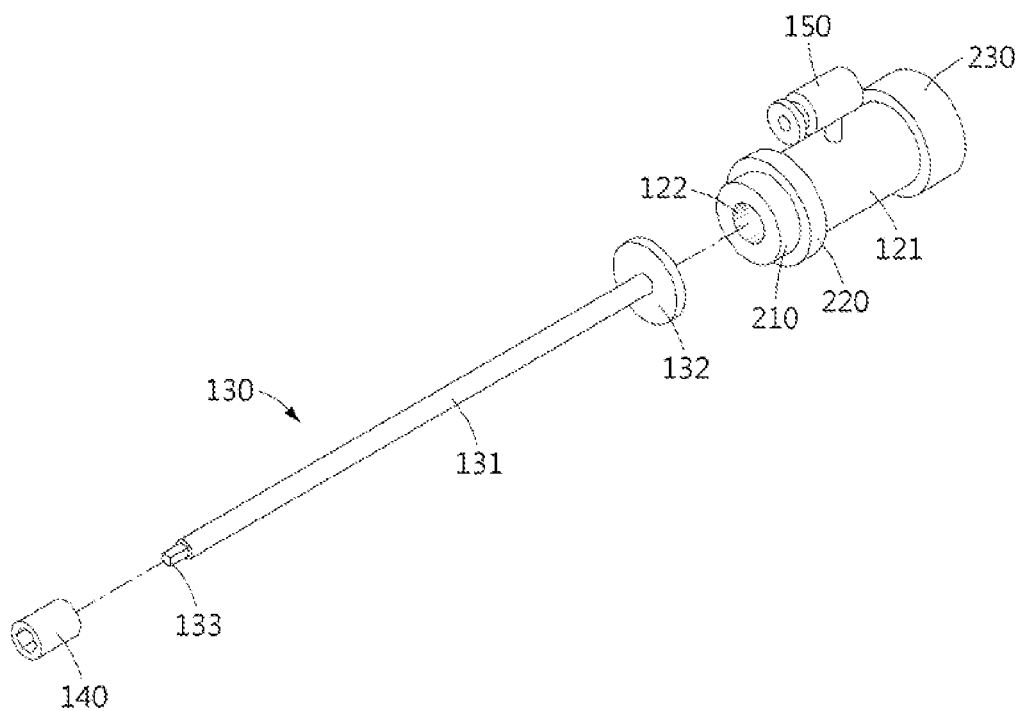
FIG. 3 is an exploded perspective view illustrating a state in which a tool mounting part, a tool, and a socket are disassembled in the filter replacement device of FIG. 1.

Hereinafter, example embodiments will be described in detail with reference to the accompanying drawings. However, various alterations and modifications may be made to the example embodiments. Here, the example embodiments are not meant to be limited by the descriptions of the present disclosure. The example embodiments should be understood to include all changes, equivalents, and replacements within the idea and the technical scope of the present disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

When describing the example embodiments with reference to the accompanying drawings, like reference numerals refer to like constituent elements and a repeated description related thereto will be omitted. In the description of the example embodiments, a detailed description of well-known related structures or functions will be omitted when it is deemed that such description will cause ambiguous interpretation of the present disclosure.

In addition, terms such as first, second, A, B, (a), (b), and the like may be used to describe components of the example embodiments. These terms are used only for the purpose of discriminating one component from another component, and the nature, the sequences, or the orders of the components are not limited by the terms. It is to be understood that if a component is described as being "connected," "coupled" or "joined" to another component, the former may be directly "connected," "coupled," and "joined" to the latter or "connected", "coupled", and "joined" to the latter via another component.

A component, which has the same common function as a component included in any one example embodiment, will be described by using the same name in other example embodiments. Unless disclosed to the contrary, the configuration disclosed in any one example embodiment may be applied to other example embodiments, and the specific description of the repeated configuration will be omitted.

A filter replacement device 100 for facility maintenance and filter replacement will be described with reference to FIGS. 1 to 9B.

The filter replacement device 100 is a device for filter replacement and facility maintenance in a radioactive structure (hereinafter referred to as a "target object" 10 (refer to FIGS. 6A and 6B)) including a nuclear power plant. The filter replacement device 100 is put into the target object 10 instead of a worker to perform maintenance work such as separating, replacing, and mounting a filter 11 (refer to FIG. 6B) in the target object 10, and in this case, the worker remotely controls from a remote location from the target object 10.

Here, the filter 11 includes a reactor coolant filter, a seal injection filter, a seal water bypass filter, a boric acid filter, a spent fuel storage tank purifying filter, a boric acid purifying filter, and the like.

Referring to the drawings, the filter replacement device 100 includes a body 110, an articulated manipulator 120 having five degrees of freedom, a tool 130 for performing all operations for replacing the filter 11 in the target object 10, and a socket 140. In addition, the filter replacement device 100 is connected to a power supply unit 170 that supplies power for driving, and is provided with a control unit 160 that controls operation.

The body 110 supports the manipulator 120 and is formed to be movable.

Figure 8A:
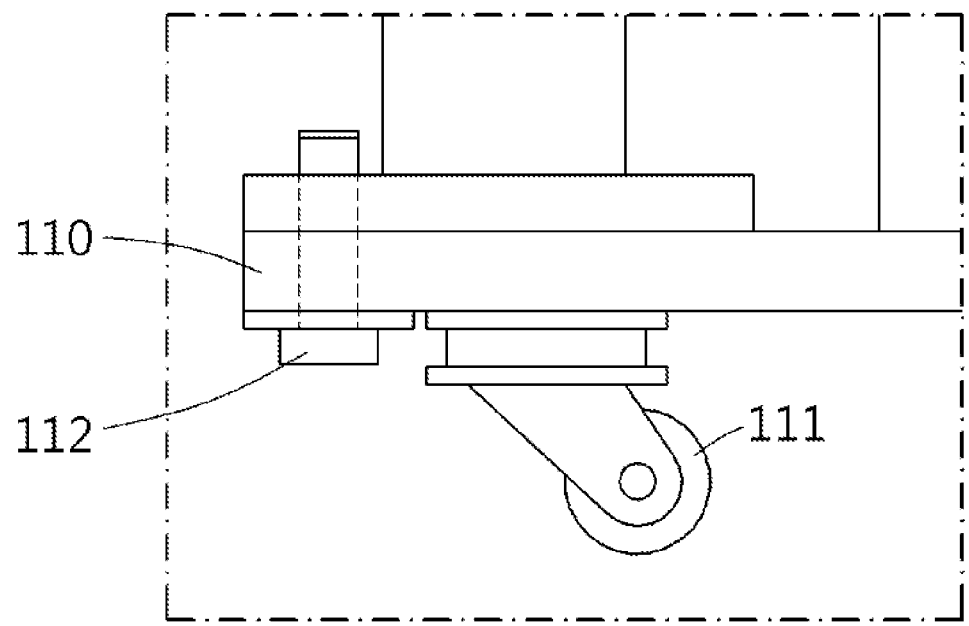
FIGS. 8A and 8B are diagrams illustrating operations of a moving part and a fastening part in a filter replacement device according to an example embodiment.
Figure 8B:
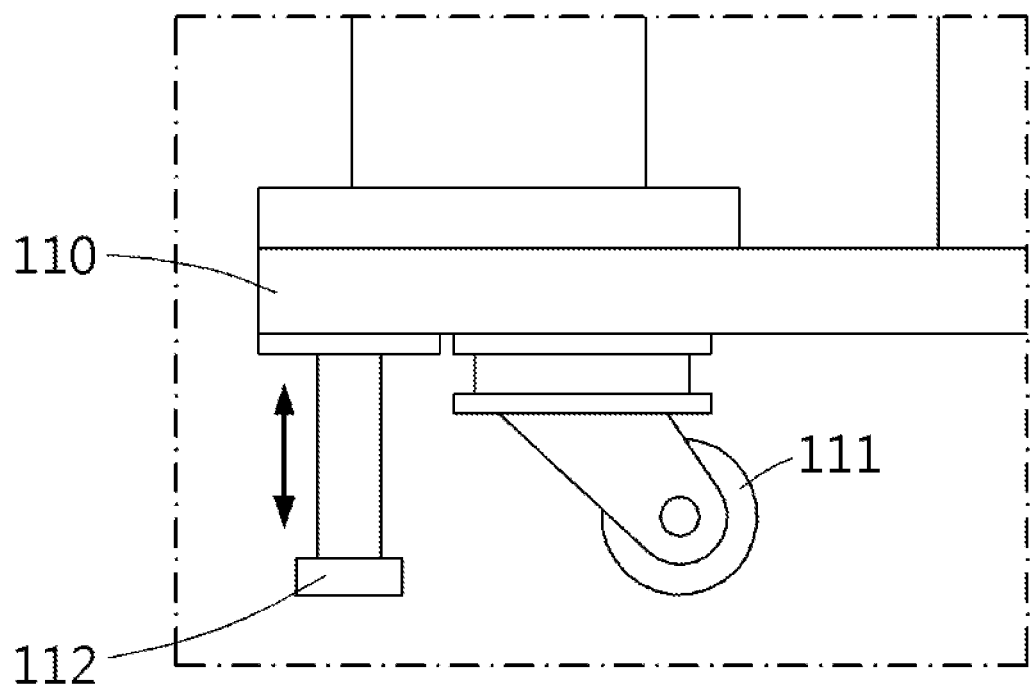

As illustrated in FIGS. 8A and 8B, the body 110 is provided with a plurality of moving parts 111 for moving the filter replacement device 100 and a fastening part 112 for fixing a position of the filter replacement device 100.

The moving part 111 is a wheel provided in a plurality under the body 110, which allows the filter replacement device 100 to be moved by a worker or a separate device (e.g., a hoist or a crane).

The fastening part 112 is provided to fix the position of the body 110 when the filter replacement device 100 is stopped, but when the filter replacement device 100 is moved, it is provided to be expanded vertically, or formed to be raised or lowered with respect to the body 110, or provided to be withdrawn from and introduced into the body 110 so as not to interfere with the movement. For example, as illustrated in FIG. 8B, the fastening part 112 has a rod shape of a predetermined length, and may be fixed to the ground by descending downward with respect to the body 110, or may rise upward and be spaced apart from the ground. A screw thread may be formed on an outer circumferential surface of the fastening part 112 in order to move the fastening part 112 up or down or to withdraw/introduce it. In addition, a pad 112a may be provided at an end of the fastening part 112 in contact with the ground so that the filter replacement device 100 can be stably fixed to the ground and prevent vibration.

However, this is only an example, and the shape of the fastening part 112 and the configuration for the operation of withdrawing/introducing are not limited by the drawings and may be substantially changed in various ways.

In addition, although the drawings illustrate that four moving parts 111 and fastening parts 112 are provided along the circumference of the body 110, the number of moving parts 111 and fastening parts 112 may be substantially changed in various ways depending on the shape and size of the body 110.

The body 110 may be provided with a counterweight 113 on one side to prevent the manipulator 120 from losing its balance due to a force applied to the manipulator 120 while replacing the filter 11. In addition, a driving unit (not shown) for driving the manipulator 120 is provided.

Figure 9A:
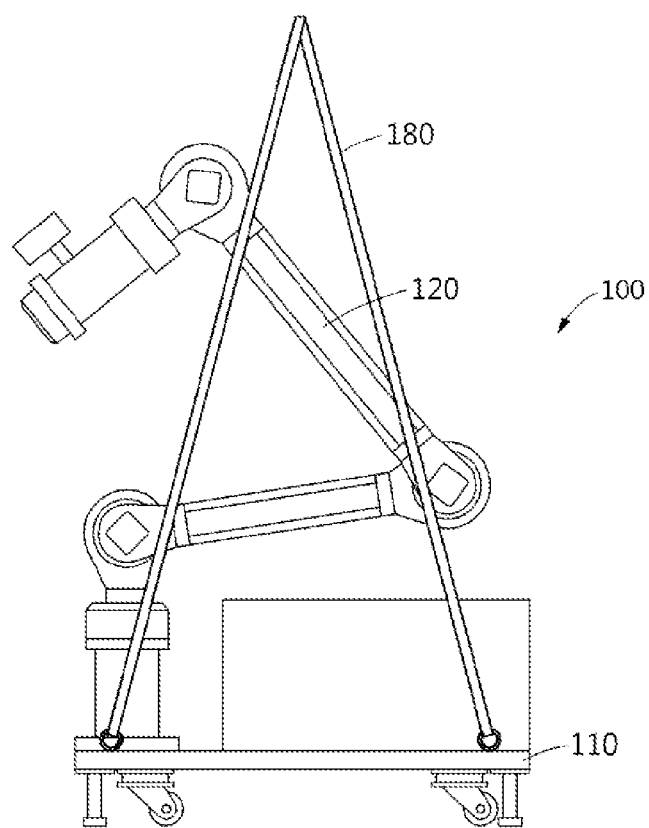
FIGS. 9A and 9B are diagrams illustrating examples of a sling being coupled according to an example embodiment.
Figure 9B:
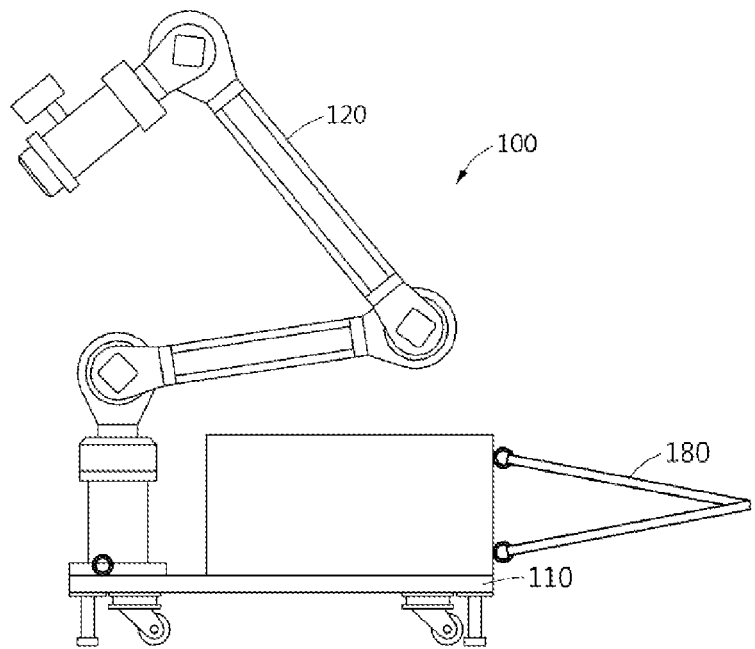

Here, the filter replacement device 100 may be further provided with a sling 180 to prevent the filter replacement device 100 from overturning due to a sudden shift in the center of gravity during operation of the manipulator 120. For example, as illustrated in FIG. 9A, the sling 180 may be coupled along a rim of the body 110 to support the body 110 from the top. Alternatively, as illustrated in FIG. 7B, the sling 180 may be coupled to the rear of the body 110 (i.e., the opposite side of a direction in which the manipulator 120 is provided) to support the body 110 from the rear.

According to the present example embodiments, by providing the sling 180, it is possible to prevent accidents such as damage, fall, and overturning while the filter replacement device 100 is moving.

The manipulator 120 includes a plurality of arm members 121, 123, and 125 and a plurality of movable parts 210, 122, 124, 126, and 128 that connect each of the arm members 121, 123, and 125 and rotationally move them. Hereinafter, the plurality of arm members and the plurality of movable parts are referred to as the first to third arm members 121, 123, and 125 and the first to fifth movable parts 210, 122, 124, 126, and 128 in order from the end of the manipulator 120.

A tool mounting part 210 to which the tool 130 is detachably mounted is provided at an end of the first arm member 121. Here, the tool mounting part 210 serves as the first movable part that rotates the mounted tool 130, and rotationally moves along the F1 direction of FIG. 2.

In addition, the second to fourth movable parts 122, 124, and 126 rotationally move in the directions F2, F3, and F4, respectively.

The fifth movable part 128 couples the manipulator 120 to the body 110 and rotationally moves the manipulator 120 in the F5 direction.

With this configuration, the manipulator 120 has five degrees of freedom in the F1 to F5 directions. In addition, the first to fifth movable parts 210, 122, 124, 126, and 128 are provided with a brake function so that each of the arm members 121, 123, and 125 may maintain a rotated position.

In the manipulator 120, a tool coordinate system is defined based on an end of the tool mounting part 210, which is the distal end, and each arm member 121, 123, and 125 moves in parallel with respect to each axis of the tool coordinate system defined as above.

The second movable part 122 is provided with a servo motor 240 for precisely driving the tool 130.

A force-torque (FT) sensor 230 for detecting the force and torque applied to the tool mounting part 210 is provided between the second movable part 122 and the first arm member 121.

A reducer 220 for increasing the torque of the servo motor 240 and transmitting the torque to the tool 130 is provided between the tool mounting part 210 and the first arm member 121.

The tool 130 has a tool body 131 having a predetermined length, a socket coupling part 133 for replacing the filter 11 is formed at one end, and a slave 132 coupled to the tool mounting part 210 is formed at the other end.

Figure 4:
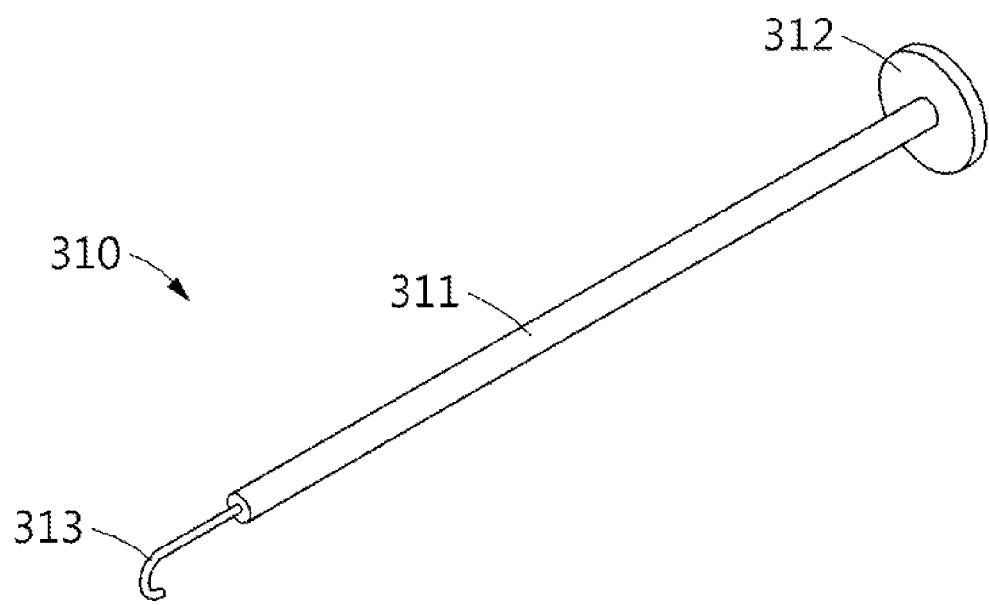
FIG. 4 is a perspective view illustrating a tool according to a modified example embodiment.

Here, the tool 130 performs an operation of loosening or tightening a bolt 14 of the target object 10 by coupling the socket 140, as illustrated in FIG. 1. Alternatively, as illustrated in FIG. 4, a tool 310 may have a shape in which a hook 313 is formed so as to be hung on a hole 13a of a lid 12 or hung on a filter 11. FIG. 4 is a perspective view of the tool 310 according to a modified example embodiment, in which 311 is a tool body 311, 312 is a slave 312, and 313 is a hook 313.

Here, unlike the above-described example embodiment, it is also possible to couple a wrench-shaped socket 140 to the tool 310 illustrated in FIG. 4. For example, by forming a structure in which the socket 140 can be coupled around where the hook 313 is formed, the bolt 14 can be loosened or tightened in a state in which the socket 140 is coupled, and when the socket 140 is separated, the lid 12 can be opened and/or closed or the filter 11 can be lifted with the hook 313.

The socket 140 is coupled to an end of the tool 130, and is a wrench that loosens or tightens the bolt 14.

In the socket 140, a tool connecting groove 143 inserted and coupled to the tool 130 is formed at one end of a socket body 141, and a bolt connecting groove 143 into which the bolt 14 is inserted and coupled to is formed at the other end.

On the other hand, in sockets 410 and 420, bolt connecting grooves 413 and 423 and hook parts 414 and 424, having a predetermined hook shape, for opening/closing the lid 12 or for lifting the filter 11 may be integrally formed.

Figure 5A:
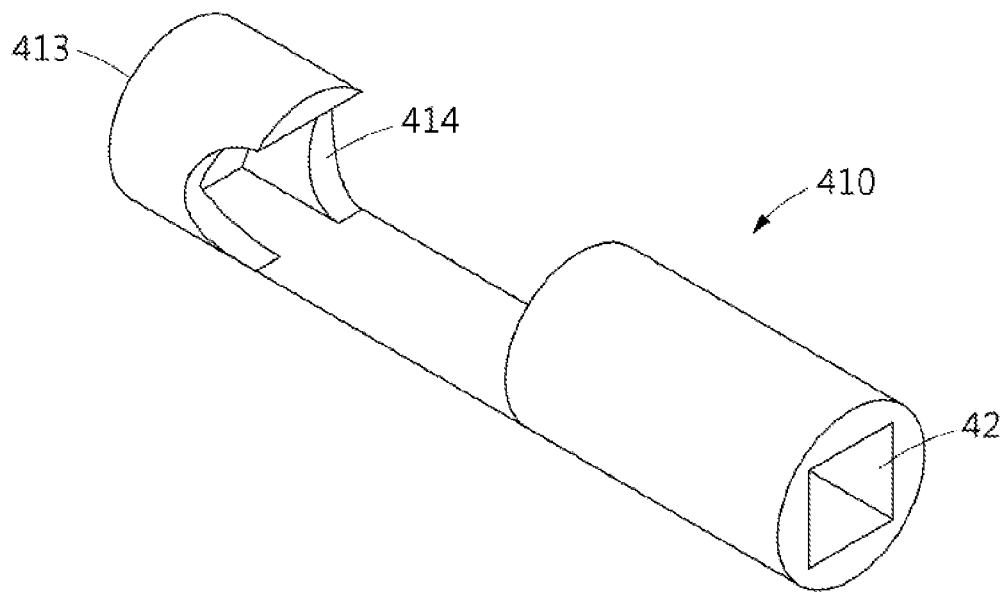
FIGS. 5A and 5B are perspective views illustrating a socket.

For example, as illustrated in FIG. 5A, the middle of the socket body 411 may be cut so that the hook part 414 may be formed in the socket 410. In FIG. 5A, 412 is a tool connecting groove 412, and 413 is a bolt connecting groove 413.

Figure 5B:
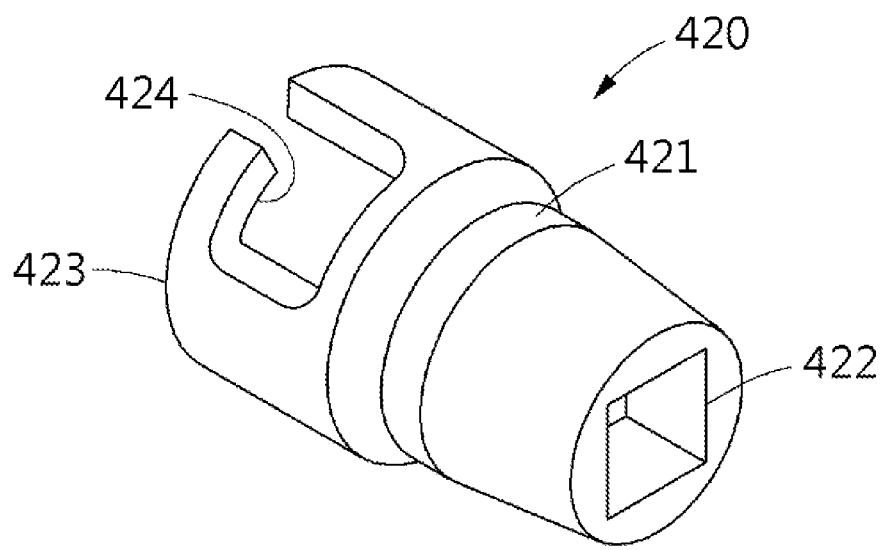
Figure 6A:
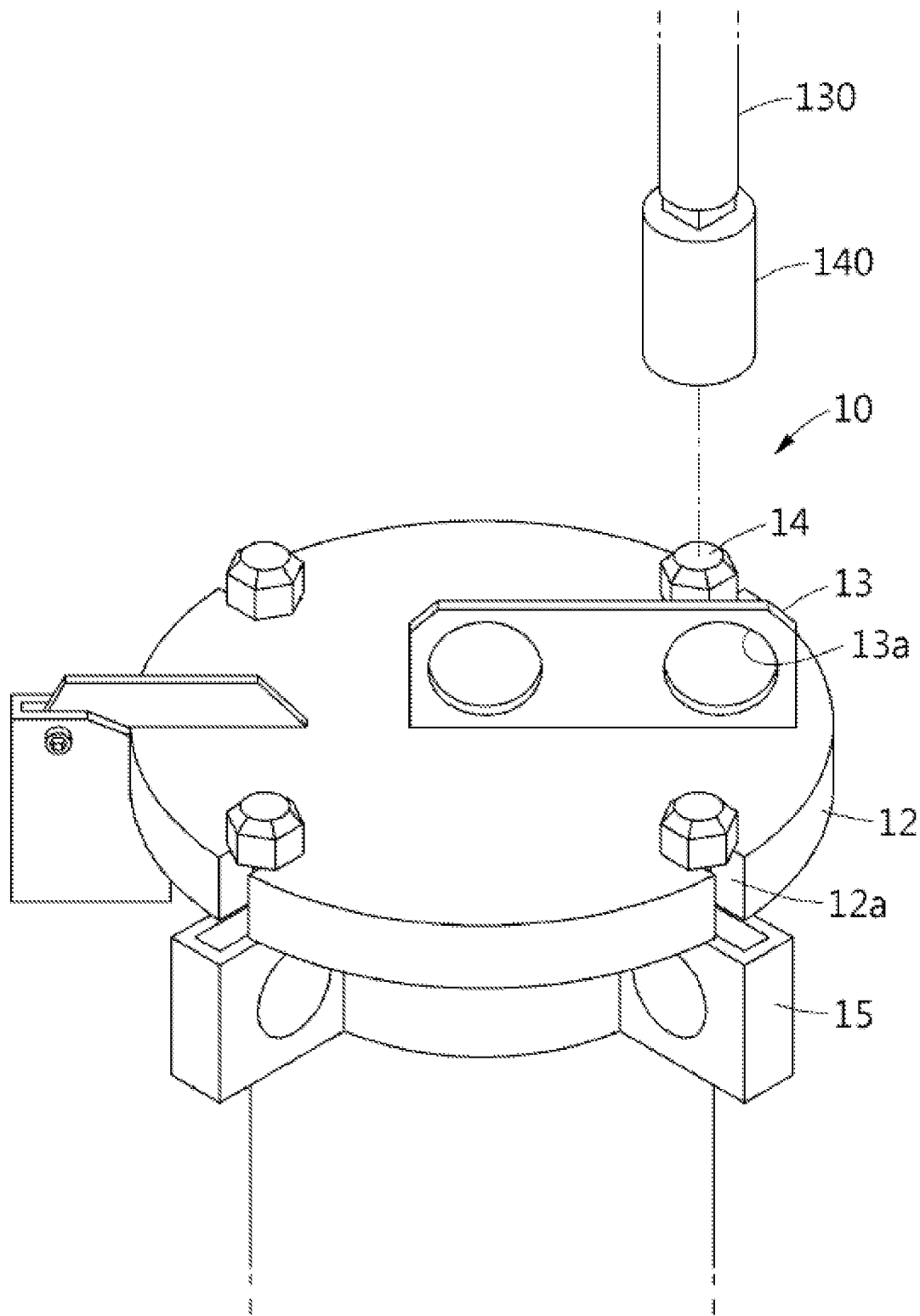
FIGS. 6A and 6B are diagrams illustrating an operation of a filter replacement device according to an example embodiment.
Figure 6B:
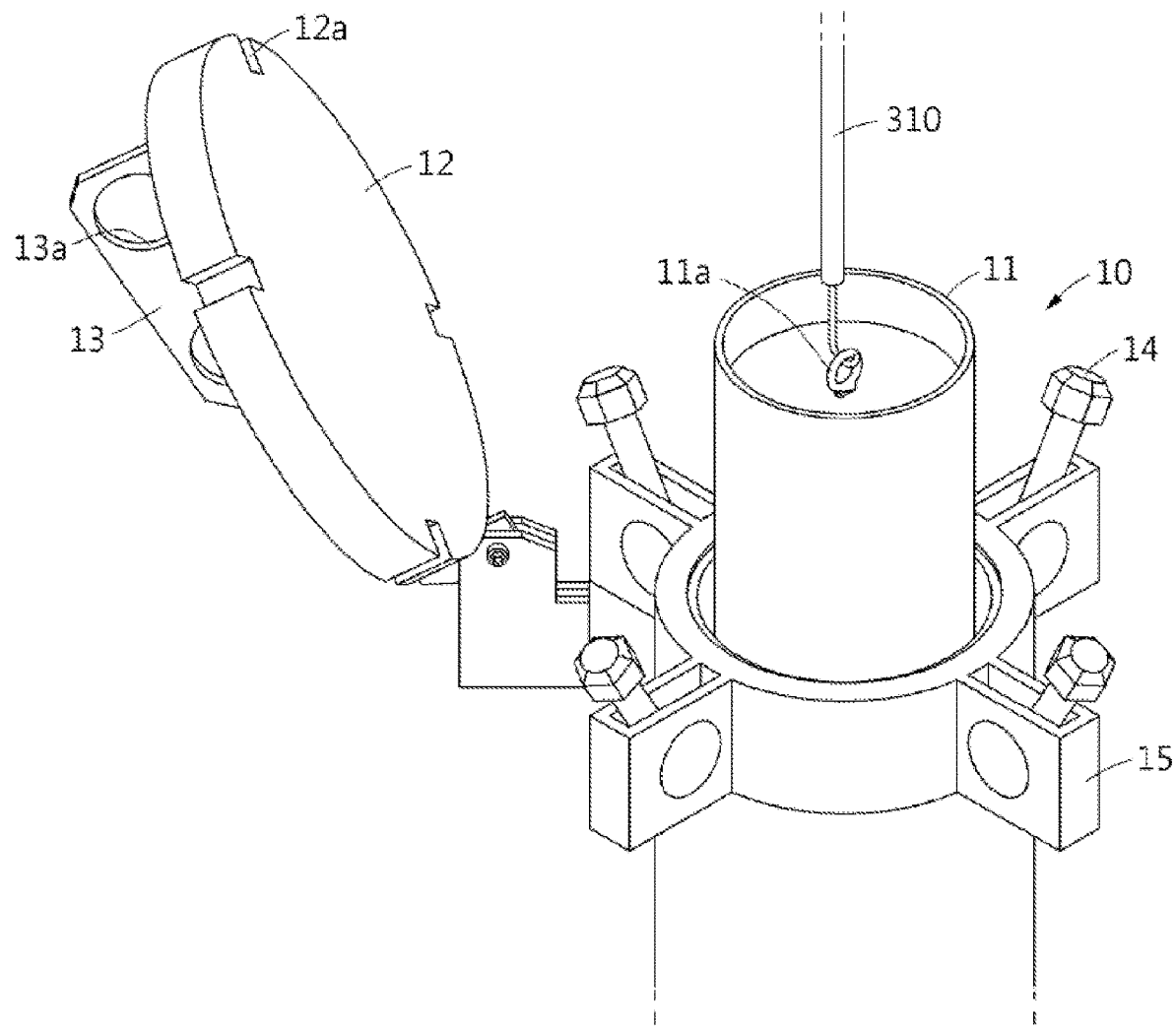

Alternatively, as illustrated in FIG. 5B, a portion of an outer circumferential surface of the other end in which the bolt connecting groove 423 is formed in the socket body 421 is cut into a predetermined shape so that the hook part 424 may be formed in the socket 420. In FIG. 5B, 422 is a tool connecting groove 422.

However, the shapes of the sockets 410 and 420 are not limited to the drawings, and may have substantially various shapes when the bolt connecting grooves 413 and 423 serving as a wrench and the hook parts 414 and 424 are integrally formed.

One side of the manipulator 120 is provided with an imaging unit 150 for capturing an end position of the tool 130 and the target object 10.

The control unit 160 detects a position of the tool 130 through an image captured by the imaging unit 150, detects a position of the bolt 14 in the target object 10, and provides the image to a worker at a remote location so that remote control is possible.

Figure 7A:
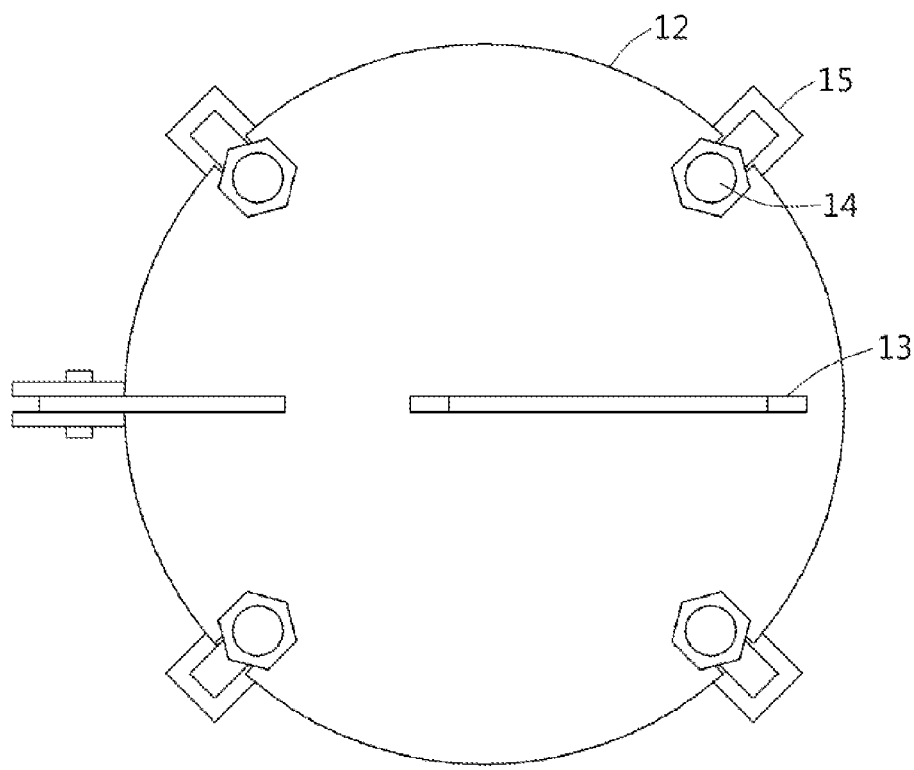
FIGS. 7A and 7B are diagrams illustrating an operation of a filter replacement device recognizing a bolt according to an example embodiment.
Figure 7B:
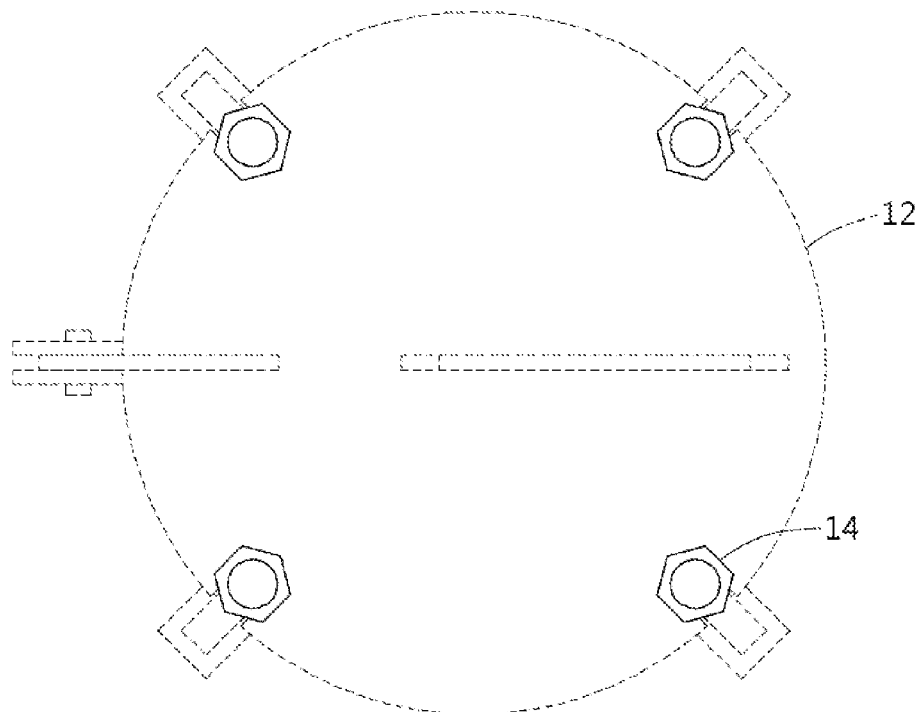

In detail, first, as illustrated in FIG. 7A, the imaging unit 150 obtains an image of the target object 10, and obtains an image in which only an outline is extracted from the obtained image.

Next, as illustrated in FIG. 7B, the control unit 160 obtains 3D coordinate information of the bolt 14 by detecting an outline image of the bolt 14 from the image in which only the outline is extracted. Here, the control unit 160 may perform calibration for correcting the obtained 3D coordinates as necessary.

Then, the control unit 160 allows the tool 130 and the socket 140 to loosen or tighten the bolt 14 by using the positional information of the bolt 14, and opens the lid 12 of the target object 10 to replace the filter 11.

Hereinafter, an operation of the filter replacement device 100 will be described.

First, the filter replacement device 100 is positioned on the target object 10, and the fastening part 112 supports the filter replacement device 100 on the ground.

Next, the manipulator 120 is driven so that the tool 130 and the socket 140 are positioned above the target object 10.

Then, when the imaging unit 150 obtains an image of the target object 10 in the imaging unit 150, the control unit 160 calculates 3D coordinates of the bolt 14 of the target object 10.

Then, by using the tool 130, the socket 140 loosens the bolt 14 and tilts it along a slot 12a of the lid 12.

When the bolt 14 is tilted all the way, the tool 130 moves to the top of the lid 12 and opens the lid 12 by being hooked into the hole 13a of a holder 13 formed on the lid 12.

Next, the tool 130 moves to the top of the filter 11 and is hooked on a ring 11a of the filter 11 to lift the filter 11 and remove it from the target object 10.

Then, a new filter 11 is hung on the tool 130, and after being inserted into the target object 10, the lid 12 is closed, and by performing the above-described process in reverse order, the bolt 14 is tightened and the operation is finished.

According to the present example embodiments, since the filter replacement device 100 performs a filter replacement operation, it is possible to prevent a worker from being overexposed to radiation during the filter replacement operation, and to prevent a safety accident such as a risk of falling while the worker is performing the operation. In addition, since the filter replacement device 100 may apply bolts of various sizes, it is possible to fasten and release bolts of various sizes, and to provide a tightening torque suitable for fastening various bolts 14, thereby increasing reliability of the bolt fastening operation. In addition, the filter replacement device 100 may prevent interference between structures of the target object 10. In addition, since the operation is performed while viewing an image or picture obtained through the imaging unit 150, damage to the filter and the filter housing may be prevented during the filter replacement operation.

While the example embodiments are described with reference to drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, other implementations, other example embodiments, and equivalents to the claims are also within the scope of the following claims.

The invention claimed is:

1. A filter replacement device for replacing a filter in a target object comprising a radioactive structure, comprising:
a body;
an articulated manipulator provided at one side of the body and having five degrees of freedom;
a tool detachably provided at an end of the manipulator to perform all operations for replacing a filter in a target object; and
a socket detachably provided on the tool, the socket comprising:
a socket body in which a tool connecting groove into which the tool is inserted and coupled is formed at one end and a bolt connecting groove into which a bolt is inserted and coupled is formed at the other end; and
a hook part having a hook shape, integrally formed on the other end of the socket body and coupled to a lid or a filter provided in the target object.

2. The filter replacement device of claim 1, wherein the hook part is formed by a portion of the socket body being cut.

3. The filter replacement device of claim 1, wherein the hook part is formed by a portion of an outer circumferential surface of a portion of the socket body where the bolt connecting groove is formed being cut.

4. The filter replacement device of claim 1, further comprising:
a plurality of moving parts for moving the body; and a fastening part for fixing a position when the body is installed.

5. The filter replacement device of claim 4, wherein the fastening part is provided to be withdrawn from and introduced into the body, so that when the body is moved, the fastening part is introduced into the body, and when the body is installed in an operation position, the fastening part is withdrawn to fix the position of the body to the ground.

6. The filter replacement device of claim 1, wherein the manipulator comprises:
a plurality of arm members;
a plurality of movable parts provided to connect and rotate the plurality of arm members; and
a tool mounting part provided at an end of a first arm member among the plurality of arm members and to which the tool is coupled,
and the tool mounting part becomes a first movable part so that the tool is rotatable with respect to the first arm member.

7. The filter replacement device of claim 6, wherein the manipulator further comprises:
an FT sensor provided on the first arm member to detect force and torque applied to the tool mounting part.

8. The filter replacement device of claim 6, wherein the manipulator further comprises:
a servo motor provided on the first arm member to precisely drive the tool.

9. The filter replacement device of claim 8, wherein the manipulator further comprises:
a reducer provided between the first arm member and the tool mounting part to increase torque of the servo motor.

10. The filter replacement device of claim 6, wherein the manipulator further comprises:
an imaging unit provided on the first arm member to capture an image for detecting a position of a bolt in the target object.

11. The filter replacement device of claim 10, further comprising:
a control unit controlling an operation of the manipulator from a remote location, wherein the control unit obtains 3D coordinates of the target object from the image captured by the imaging unit and performs calibration to correct the obtained 3D coordinates.

* * * * *